(12) United States Patent
Wang et al.

(10) Patent No.: US 12,460,926 B2
(45) Date of Patent: Nov. 4, 2025

(54) DETECTION METHOD, SURFACE DENSITY DEVICE, DETECTION MEANS, AND STORAGE MEDIUM

(71) Applicant: CONTEMPORARY AMPEREX TECHNOLOGY (HONG KONG) LIMITED, Hong Kong (CN)

(72) Inventors: Qiangjun Wang, Ningde (CN); Jingdong Zhang, Ningde (CN); Bingyang Zhan, Ningde (CN); Zhihui Zhen, Ningde (CN); Weigang Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 166 days.

(21) Appl. No.: 18/382,862

(22) Filed: Oct. 23, 2023

(65) Prior Publication Data

US 2024/0151521 A1 May 9, 2024

Related U.S. Application Data

(63) Continuation of application No. PCT/CN2023/091278, filed on Apr. 27, 2023.

(30) Foreign Application Priority Data

Nov. 8, 2022 (CN) .......................... 202211394373.2

(51) Int. Cl.
*G01B 15/02* (2006.01)
*G01N 23/223* (2006.01)

(52) U.S. Cl.
CPC .......... *G01B 15/02* (2013.01); *G01N 23/223* (2013.01); *G01N 2223/303* (2013.01); *G01N 2223/304* (2013.01)

(58) Field of Classification Search
CPC .... G01B 15/02; G01B 15/025; G01N 23/223; G01N 2223/303; G01N 2223/304; G01N 9/24; G01N 23/083; Y02E 30/30
See application file for complete search history.

(56) References Cited

U.S. PATENT DOCUMENTS

2003/0107339 A1    6/2003    Shimizu et al.

FOREIGN PATENT DOCUMENTS

CN          86209739 U    *  9/1987
CN           1991345 A       7/2007
(Continued)

OTHER PUBLICATIONS

The World Intellectual Property Organization (WIPO) International Search Report and Written Opinion for PCT/CN2023/091278 Jul. 27, 2023 17 pages (Including English translation).
(Continued)

*Primary Examiner* — Kiho Kim
(74) *Attorney, Agent, or Firm* — ANOVA LAW GROUP, PLLC

(57) ABSTRACT

A detection method includes obtaining, during operation of a surface density device, a first current pose of a radiation source of the surface density device and a second current pose of a ionization chamber of the surface density device; ascertaining a first pose deviation of the radiation source based on the first current pose; ascertaining a second pose deviation of the ionization chamber based on the second current pose; and determining whether the radiation source has undergone a pose change with respect to the ionization chamber based on the first pose deviation and the second pose deviation.

11 Claims, 11 Drawing Sheets

(56) References Cited

FOREIGN PATENT DOCUMENTS

| | | |
|---|---|---|
| CN | 102944498 A | 2/2013 |
| CN | 103876759 A | 6/2014 |
| CN | 110243723 A | 9/2019 |
| CN | 114123879 A | 3/2022 |
| CN | 115015039 A | 9/2022 |
| CN | 115096756 A | 9/2022 |
| CN | 217605573 U | 10/2022 |
| CN | 115931633 A | 4/2023 |
| WO | 2008110017 A1 | 9/2008 |
| WO | 2016050202 A1 | 4/2016 |

OTHER PUBLICATIONS

The European Patent Office (EPO) the Extended European Search Report for Application No. 23789483.7 Aug. 13, 2024 8 Pages.
State Intellectual Property Office of China Notice of Decision of Granting Patent Right for Utility Model for Application No. 202211394373.2 Jun. 2, 2025, 6 pages (including translation).
The European Patent Office (EPO) The Extended European Search Report for Application No. 23789483.May 7, May 15, 2025 5 Pages.

\* cited by examiner

DETECTION METHOD, SURFACE DENSITY DEVICE, DETECTION MEANS, AND STORAGE MEDIUM

CROSS-REFERENCE TO RELATED APPLICATIONS

This application is a continuation of International Application No. PCT/CN2023/091278, filed on Apr. 27, 2023, which claims priority to Patent Application No. 202211394373.2 filed with the China National Intellectual Property Administration on Nov. 8, 2022, which are incorporated herein by reference in their entirety.

TECHNICAL FIELD

This application relates to the field of detection technologies, and in particular, to a detection method, a surface density device, a detection means, and a storage medium.

BACKGROUND

A surface density device is a device for measuring the thickness and/or density of sheet objects. The surface density device generally includes a radiation source and an ionization chamber. When the surface density device is in operation, an object under measurement is placed between the radiation source and the ionization chamber, and the radiation source emits rays to the object under measurement. The rays pass through the object under measurement and enter the ionization chamber, and the ionization chamber determines a thickness and/or density of the object under measurement according to the degree of attenuation of the rays. However, the relative position between the radiation source and the ionization chamber may change when the surface density device is used for a long time, resulting in inaccurate measurement results.

SUMMARY

Embodiments of this application provide a detection method, a surface density device, a detection means, and a storage medium, so as to at least partially solve the technical problem of inaccurate measurement results caused by a change of the relative position between a radiation source and an ionization chamber that may occur when the surface density device is used for a long time.

In a detection method of the surface density device according to an embodiment of this application, where the surface density device includes a radiation source and an ionization chamber spaced from the radiation source, and the detection method includes:
  obtaining, during operation of the surface density device, a first current pose of the radiation source and a second current pose of the ionization chamber;
  ascertaining a first pose deviation of the radiation source based on the first current pose;
  ascertaining a second pose deviation of the ionization chamber based on the second current pose; and
  determining whether the radiation source has undergone a pose change with respect to the ionization chamber based on the first pose deviation and the second pose deviation.

The detection method according to the embodiment of this application first obtains the current poses of the radiation source and the ionization chamber separately, then ascertains whether the radiation source has undergone a pose change with respect to the ionization chamber based on the current poses, so that when the radiation source has undergone a pose change with respect to the ionization chamber, corresponding measures can be taken to improve the accuracy of measurement results of the surface density device.

In addition, poses of the radiation source and the ionization chamber are detected during operation of the surface density device, which makes a measurement process more convenient without stopping the surface density device and facilitates correction of a measurement result of the surface density device in real time, making the measurement efficiency of the surface density device higher.

In some embodiments, the obtaining a first current pose of the radiation source and a second current pose of the ionization chamber includes:
  obtaining current positions of the radiation source and the ionization chamber in at least one direction to determine the first current pose and the second current pose.

In this way, the first current pose and the second current pose are more easily determined.

In some embodiments, the obtaining current positions of the radiation source and the ionization chamber in at least one direction to determine the first current pose and the second current pose includes:
  obtaining a first current position of the radiation source in a first direction, the first direction being the same as a moving direction of the radiation source;
  obtaining a second current position of the ionization chamber in the first direction, where the first current pose includes the first current position and the second current pose includes the second current position; and
  the determining whether the radiation source has undergone a pose change with respect to the ionization chamber based on the first pose deviation and the second pose deviation includes:
  determining that the radiation source has undergone a pose change with respect to the ionization chamber in the first direction when the first pose deviation and the second pose deviation are different in degree of deviation.

In this way, it is possible to detect whether the ionization chamber and the radiation source have undergone a pose change relative to each other in the first direction.

In some embodiments, the obtaining a first current position of the radiation source in a first direction includes:
  obtaining first current positions of two different sites of the radiation source in the first direction;
  determining a first torsional amount of the radiation source based on the two first current positions, where the first current pose includes the first torsional amount;
  the obtaining a second current position of the ionization chamber in the first direction includes:
  obtaining second current positions of two different sites of the ionization chamber in the first direction; and
  determining a second torsional amount of the ionization chamber based on the two second current positions, where the second current pose includes the second torsional amount; and
  the determining whether the radiation source has undergone a pose change with respect to the ionization chamber based on the first pose deviation and the second pose deviation includes:
  determining that the radiation source has undergone a torsional pose change with respect to the ionization chamber when the first pose deviation and the second pose deviation are different in degree of deviation.

In this way, it is possible to determine whether a pose change in a torsional state between the radiation source and the ionization chamber has occurred.

In some embodiments, the obtaining current positions of the radiation source and the ionization chamber in at least one direction to determine the first current pose and the second current pose includes:

obtaining a third current position of the radiation source in a second direction, where the second direction is perpendicular to a moving direction of the radiation source, and the second direction is perpendicular to an arrangement direction of the radiation source and the ionization chamber; and obtaining a fourth current position of the radiation source in the second direction, where the first current pose includes the third current position and the second current pose includes the fourth current position; and the determining whether the radiation source has undergone a pose change with respect to the ionization chamber based on the first pose deviation and the second pose deviation includes:

determining that the radiation source has undergone a pose change with respect to the ionization chamber in the second direction when the first pose deviation and the second pose deviation are different in degree of deviation.

In this way, it is possible to detect whether the ionization chamber and the radiation source have undergone a pose change relative to each other in the second direction.

In some embodiments, the obtaining current positions of the radiation source and the ionization chamber in at least one direction to determine the first current pose and the second current pose includes:

obtaining a fourth current position of the radiation source in a third direction, the third direction being the same as an arrangement direction of the radiation source and the ionization chamber; and obtaining a fifth current position of the radiation source in the third direction, where the first current pose includes the fourth current position and the second current pose includes the fifth current position; and the determining whether the radiation source has undergone a pose change with respect to the ionization chamber based on the first pose deviation and the second pose deviation includes:

determining that the radiation source has undergone a pose change with respect to the ionization chamber in the third direction when the first pose deviation and the second pose deviation are different in degree of deviation.

In this way, it is possible to detect whether the ionization chamber and the radiation source have undergone a pose change relative to each other in the third direction.

In some embodiments, the detection method further includes:

correcting a measurement result of the surface density device based on an amount of pose change when the radiation source has undergone a pose change with respect to the ionization chamber.

In this way, the measurement result of the surface density device is corrected based on the amount of pose change, making the measurement result of the surface density device more accurate.

A surface density device according to an embodiment of this application includes:

a radiation source;

an ionization chamber spaced from the radiation source;

a memory, a processor, and a computer program stored in the memory and capable of running on the processor, where when the program is executed by the processor, the steps of the method in any one of the foregoing embodiments are implemented.

In this way, the current poses of the radiation source and the ionization chamber are first obtained separately, and then it is ascertained whether the radiation source has undergone a pose change with respect to the ionization chamber based on the current poses, so that when the radiation source has undergone a pose change with respect to the ionization chamber, corresponding measures can be taken to improve the accuracy of measurement results of the surface density device.

In some embodiments, both the radiation source and the ionization chamber are provided with distance sensors, the distance sensors being configured to detect distances from the radiation source and the ionization chamber to a predetermined position.

In this way, current poses of the radiation source and the ionization chamber can be easily obtained based on the distance sensors.

A detection means includes:

an obtaining module configured to obtain, during operation of a surface density device, a first current pose of the radiation source of the surface density device and a second current pose of the ionization chamber of the surface density device;

an ascertaining module configured to ascertain a first pose deviation of the radiation source based on the first current pose and a second pose deviation of the ionization chamber based on the second current pose; and a determining module configured to determine whether the radiation source has undergone a pose change with respect to the ionization chamber based on the first pose deviation and the second pose deviation.

In this way, the current poses of the radiation source and the ionization chamber are first obtained separately, and then it is ascertained whether the radiation source has undergone a pose change with respect to the ionization chamber based on the current poses, so that when the radiation source has undergone a pose change with respect to the ionization chamber, corresponding measures can be taken to improve the accuracy of measurement results of the surface density device.

An embodiment of this application further provides a non-volatile computer-readable storage medium of computer-executable instructions, where when the computer-executable instructions are executed by one or more processors, the processors are enabled to perform the detection method in any one of the foregoing embodiments.

For additional aspects and advantages of this application, some will be given in the following description, and some will become apparent in the following description or will be understood in the practice of this application.

BRIEF DESCRIPTION OF DRAWINGS

The above and/or additional aspects and advantages of this application will become obvious and easy to understand from the description of the embodiments with reference to the following drawings.

Figure 1:
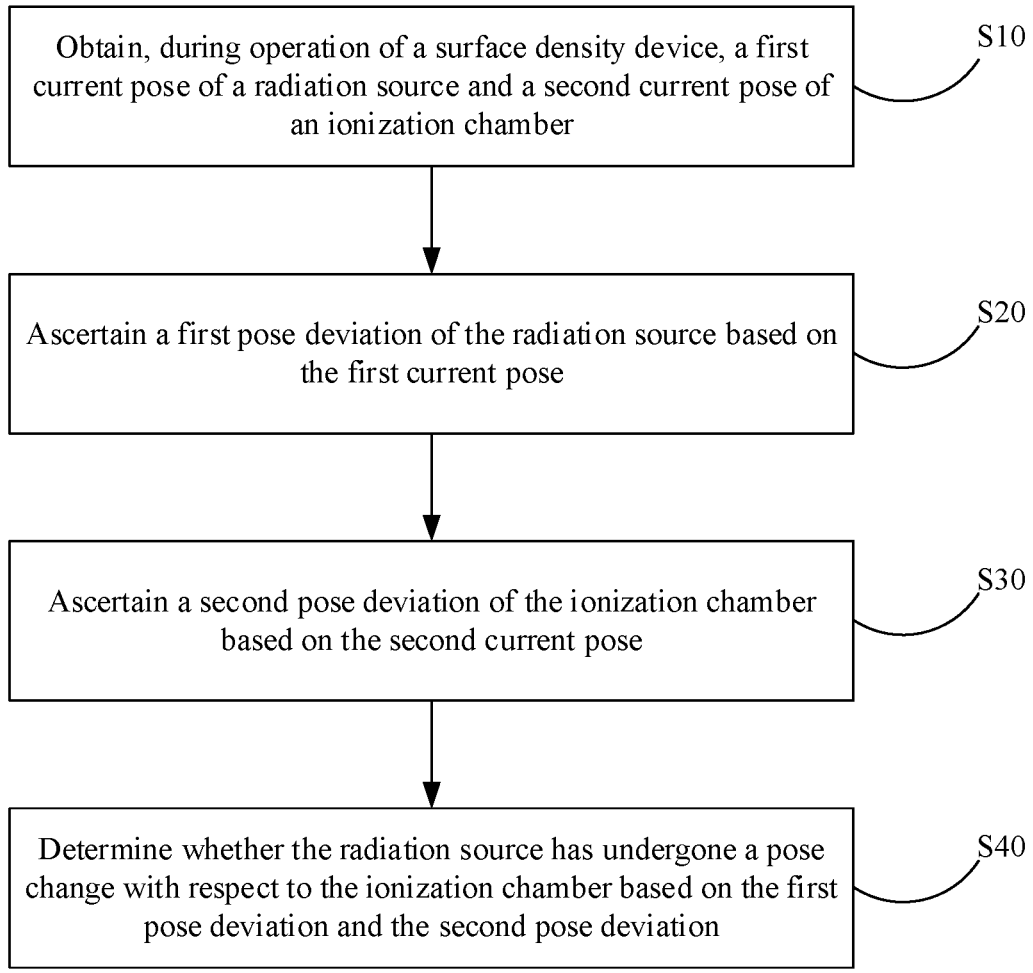
FIG. 1 is a schematic flowchart of a detection method according to an embodiment of this application.

Reference signs of the accompanying drawings are described as follows:

surface density device 100, radiation source 10, ionization chamber 20, first predetermined position 30, second predetermined position 40, third predetermined position 50, fourth predetermined position 60;

first distance sensor 101, second distance sensor 102, third distance sensor 103, fourth distance sensor 104, fifth distance sensor 105, sixth distance sensor 106, seventh distance sensor 107, eighth distance sensor 108; and detection means 200, obtaining module 210, ascertaining module 220, and determining module 230.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects. In this disclosure, the phrases "at least one of A, B, and C" and "at least one of A, B, or C" both mean only A, only B, only C, or any combination of A, B, and C.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

A surface density device is a device for measuring the thickness and/or density of sheet objects. The surface density device generally includes a radiation source and an ionization chamber. When the surface density device is in operation, an object under measurement (for example, an electrode plate) is placed between the radiation source and the ionization chamber, and the radiation source emits rays to the object under measurement. The rays pass through the object under measurement and enter the ionization chamber, and the ionization chamber determines a thickness and/or density of the object under measurement according to the degree of attenuation of the rays.

In surface density device, the radiation source and ionization chamber are generally installed on a guide rail. After the surface density device is assembled and commissioned, the radiation source and ionization chamber reciprocate on the guide rail to scan and detect an object under measurement. After the density device has been used for a period of time, if the guide rails and other components of the surface density device undergo large deformation, loose fasteners, wear and tear of transmission parts, and the like, the relative pose between the radiation source and the detector changes, and then effective rays emitted by the radiation source and passed through the object under measurement cannot be completely received by the ionization chamber, resulting in inaccurate measurement results of the surface density device.

The inventors found through statistics that if a lateral displacement between the radiation source and the ionization chamber is 4 mm, the measurement accuracy of the surface density device is reduced by about 11%; that if a longitudinal displacement between the radiation source and the ionization chamber is 4 mm, the measurement accuracy of the surface density device is reduced by about 5.5%; and that if opposite faces of the radiation source and the ionization chamber are twisted by 2°, the measurement accuracy of the surface density device is reduced by about 5%.

For the above technical problems, after research, the inventors have known that the surface density device can be serviced regularly when the surface density device does not need to measure an object under measurement, so as to ensure the measurement accuracy of the surface density device. However, the surface density device may fail between two maintenance processes, resulting in wrong measurement results for a large number of measured objects and leading to serious economic losses.

In view of this, through careful research by the inventors, by detecting the poses of the radiation source and the ionization chamber in real time during operation of the surface density device to determine whether the relative pose between the radiation source and the ionization chamber has changed and taking corresponding measures in a timely manner to improve the measurement accuracy of the surface density device, the inventors have solved the technical problem of inaccurate measurement results caused by a change of the relative position between the radiation source and the ionization chamber that may occur.

Figure 2:
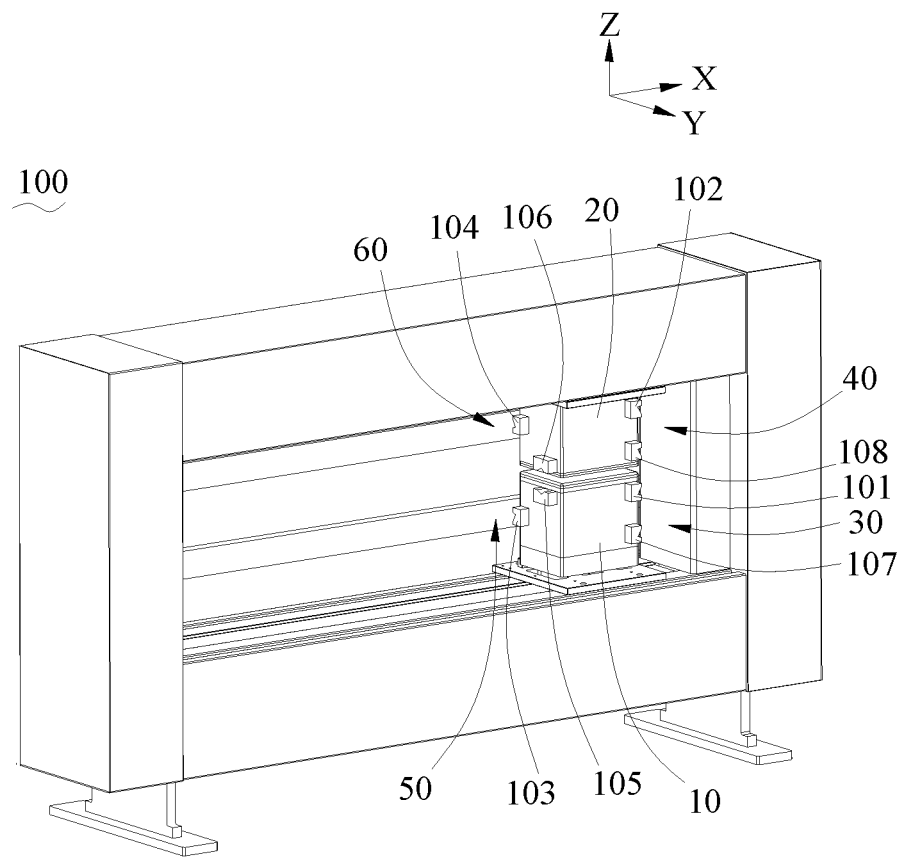
FIG. 2 is a three-dimensional diagram of a surface density device according to an embodiment of this application.

Refer to FIG. 1 and FIG. 2. FIG. 1 is a schematic flowchart of a detection method according to an embodiment of this application. FIG. 2 is a three-dimensional diagram of a surface density device 100 according to an embodiment of this application.

The detection method according to the embodiment of this application is applied to a surface density device 100, where the surface density device 100 includes a radiation source 10 and an ionization chamber 20 spaced from the radiation source 10, and the detection method includes:

S10. Obtain, during operation of the surface density device 100, a first current pose of the radiation source 10 and a second current pose of the ionization chamber 20.

S20. Ascertain a first pose deviation of the radiation source 10 based on the first current pose.

S30. Ascertain a second pose deviation of the ionization chamber 20 based on the second current pose.

S40. Determine whether the radiation source 10 has undergone a pose change with respect to the ionization chamber 20 based on the first pose deviation and the second pose deviation.

Specifically, the surface density device 100 is an apparatus for measuring the thickness and/or density of sheet objects. The radiation source 10 is a component for emitting detection rays, the detection rays being, for example, X-rays. The rays emitted by the radiation source 10 is directed toward the ionization chamber 20, or in other words, the radiation source 10 emits rays toward the ionization chamber 20. The ionization chamber 20 is a component for receiving detection rays, and the ionization chamber 20 is also called a detector. In the orientation shown in FIG. 2, the ionization chamber 20 is provided above the radiation source 10. A gap is present between the ionization chamber 20 and the radiation source 10 and an object under measurement is located in the gap.

During operation of the surface density device 100, the radiation source 10 and the ionization chamber 20 can move reciprocally in direction X (a first direction) synchronously, and the object under measurement can move in direction Y (a second direction), and the radiation source 10 emits detection rays in direction Z (a third direction), so that the detection rays pass through the object under measurement and enter the ionization chamber 20 and are captured by the ionization chamber 20. The surface density device 100 can calculate the weight per unit area (that is, the surface density) of the object under measurement based on the intensity of the detection rays captured by the ionization chamber 20.

In step S10, the operation of the surface density device 100 refers to a process in which the surface density device 100 is detecting parameters of the object under measurement such as the surface density. The pose of the radiation source 10 is the position and posture of the radiation source 10, for example, a distance of the radiation source 10 with respect to a reference position, an angle of rotation, and other parameters. The reference position here may be a single position or a plurality of different positions. Similarly, the pose of the ionization chamber 20 is the position and posture of the ionization chamber 20. The current pose is a pose detected in real time. For example, a pose detected by the radiation source 10 at the current moment is the current pose.

The first current pose and the second current pose may be measured by sensors such as distance sensors. For example, a distance sensor may be installed on the radiation source 10, and the first current pose is obtained according to a distance that is between the distance sensor and a fixed position on the surface density device and measured by the distance sensor. For example, the first current pose and the second current pose may be measured by a sensor such as a gyroscope. This application does not impose limitation on the specific way of detecting the first current pose and the second current pose.

In steps S20 and S30, the first pose deviation may be a deviation amount of the first current pose with respect to a first initial pose, and the second pose deviation may be a deviation amount of the second current pose with respect to a second initial pose.

The first initial pose and the second initial pose are respective poses of the radiation source 10 and the ionization chamber 20 at a position of a motion stroke after assembly and calibration of the surface density device 100. The first initial pose may be measured by a relevant device and maintained in the surface density device 100. For example, the first initial pose may be measured by a detection component such as a sensor.

It can be understood that if the value of the first current pose is equal to the value of the first initial pose, then the first pose deviation is 0. In other words, the current pose of the radiation source 10 does not change with respect to the initial pose.

In step S40, if at least one of the first pose deviation and the second pose deviation is greater than a deviation threshold, and the first pose deviation and the second pose deviation cannot cancel each other out, then it may be indicated that the radiation source 10 has undergone a pose change with respect to the ionization chamber 20. For example, if the radiation source 10 and the ionization chamber 20 change a same distance in a same direction, then it is considered that the first pose deviation and the second pose deviation can cancel each other out, and no pose change has occurred on the radiation source 10 and the ionization chamber 20.

Figure 3:
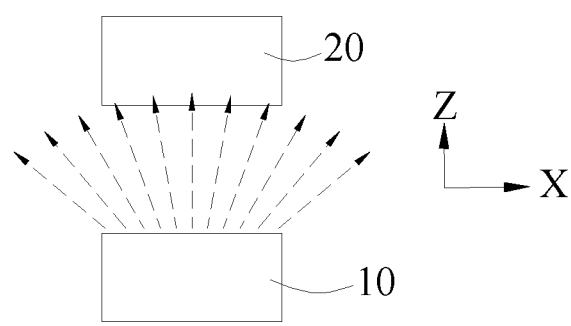
FIG. 3 is a schematic diagram of a radiation source and an ionization chamber that are in normal pose according to an embodiment of this application.
Figure 4:
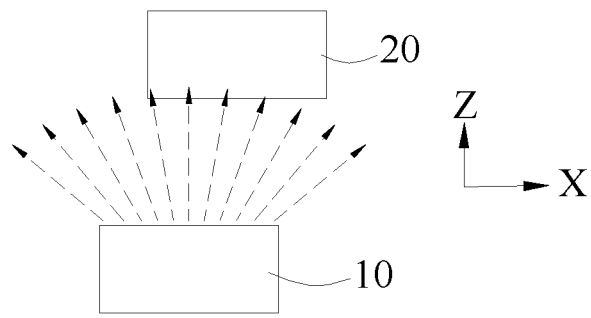
FIG. 4 is a schematic diagram of a pose change of a radiation source with respect to an ionization chamber according to an embodiment of this application.
Figure 5:
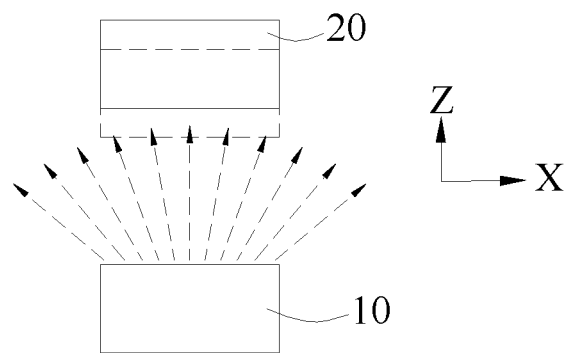
FIG. 5 is a schematic diagram of a pose change of a radiation source with respect to an ionization chamber according to an embodiment of this application.
Figure 6:
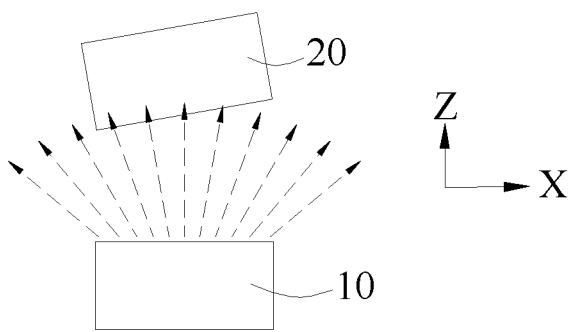
FIG. 6 is a schematic diagram of a pose change of a radiation source with respect to an ionization chamber according to an embodiment of this application.

As shown in FIG. 3, FIG. 3 is a schematic diagram of the radiation source 10 and ionization chamber 20 in normal positions, and FIG. 3 illustrates that no pose change has occurred on the radiation source 10 and the ionization chamber 20. FIG. 4 to FIG. 6 illustrate different pose changes that have occurred on the radiation source 10 and ionization chamber 20, respectively.

In this way, the detection method according to the embodiment of this application first obtains the current poses of the radiation source 10 and the ionization chamber 20 separately, then ascertains whether the radiation source 10 has undergone a pose change with respect to the ionization chamber 20 based on the current poses, so that when the radiation source 10 has undergone a pose change with respect to the ionization chamber 20, corresponding measures can be taken to improve the accuracy of measurement results of the surface density device 100.

In addition, poses of the radiation source 10 and the ionization chamber 20 are detected during operation of the surface density device 100, which makes a measurement process more convenient without stopping the surface density device 100 and facilitates correction of a measurement result of the surface density device 100 in real time, making the measurement efficiency of the surface density device 100 higher.

Figure 7:
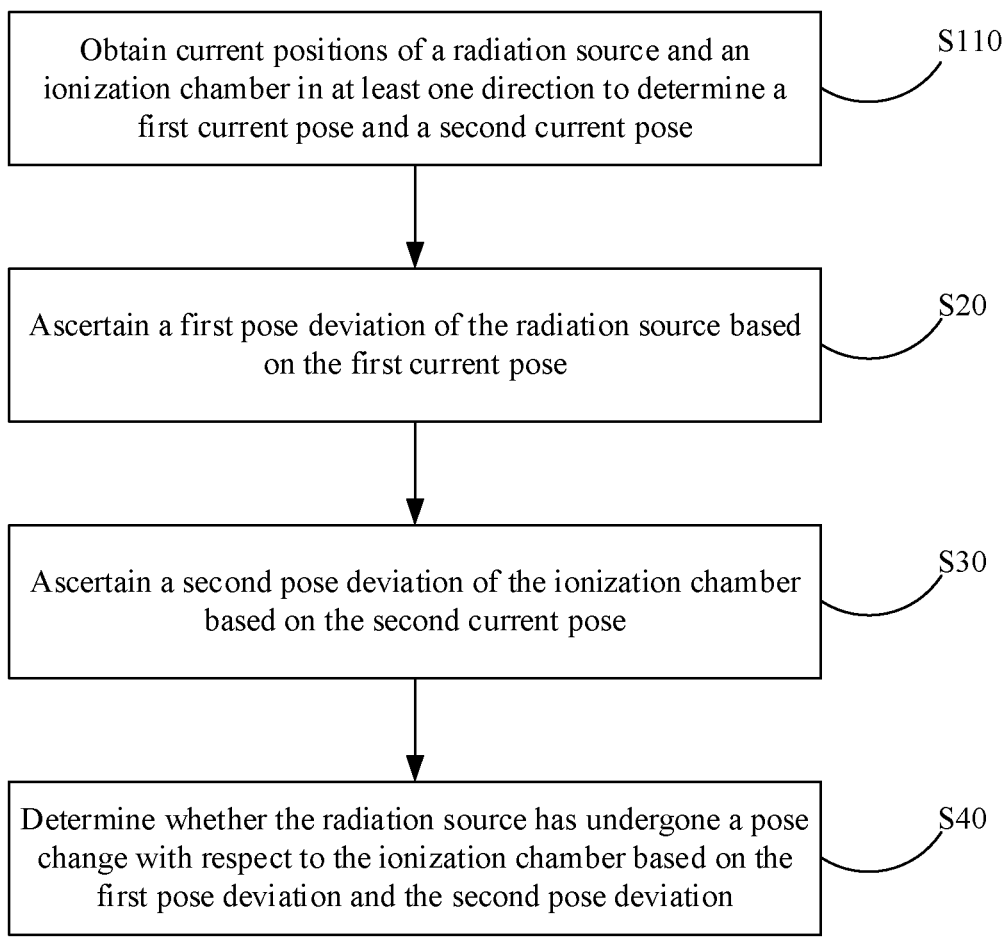
FIG. 7 is a schematic flowchart of a detection method according to an embodiment of this application.

Refer to FIG. 7. In some embodiments, the obtaining (S10) a first current pose of the radiation source 10 and a second current pose of the ionization chamber 20 includes:

S110. Obtain current positions of the radiation source 10 and the ionization chamber 20 in at least one direction to determine the first current pose and the second current pose.

Specifically, a current position of the radiation source 10 in a direction may be expressed in terms of a distance between the radiation source 10 and a predetermined position. For example, a three-dimensional coordinate system may be set up on the surface density device 100, and the current position of the radiation source 10 may be determined based on coordinates of the radiation source 10. Similarly, a current position of the ionization chamber 20 in a direction may be expressed in terms of a distance between the ionization chamber 20 and a predetermined position.

In this way, the first current pose and the second current pose are more easily determined.

Figure 8:
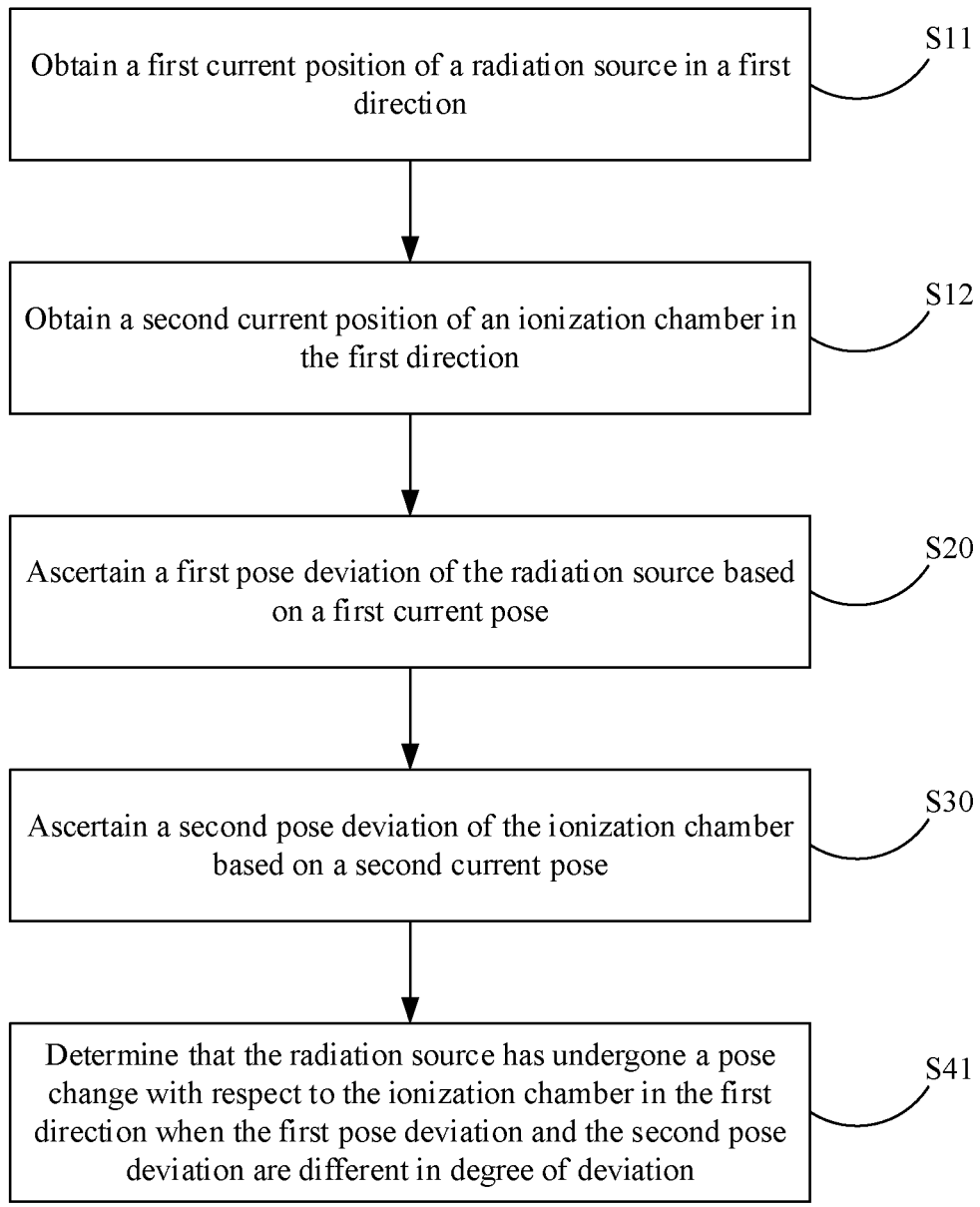
FIG. 8 is a schematic flowchart of a detection method according to an embodiment of this application.

Refer to FIG. 8. In some embodiments, step S110 includes:

S11. Obtain a first current position of the radiation source 10 in a first direction (such as X-direction in FIG. 2), the first direction being the same as a moving direction of the radiation source 10; and S12. Obtain a second current position of the ionization chamber 20 in the first direction, where the first current pose includes the first current position and the second current pose includes the second current position.

Step S40 includes:

S41. Determine that the radiation source 10 has undergone a pose change with respect to the ionization chamber 20 in the first direction when the first pose deviation and the second pose deviation are different in degree of deviation.

Specifically, in step S11, the first current position may be represented by a distance. In other words, a first current distance between the radiation source 10 and a first predetermined position 30 in the first direction may be obtained to determine the first current position. The radiation source 10 may reciprocate back and forth in the X-direction. The first predetermined position 30 may be a position of the surface density device 100 along the X-direction toward the radiation source 10. For example, in the embodiments of this application, the first predetermined position 30 is a plane located in positive X-direction of the radiation source 10. The first current distance may be measured using a first distance sensor 101. The first distance sensor 101 may be installed on the radiation source 10 or at the first predetermined position 30. The first distance sensor 101 is, for example, a laser sensor. The first distance sensor 101 can measure and obtain the first current distance by emitting light and receiving reflected light.

In step S12, the second current position may be represented by a distance. In other words, a second current distance between the ionization chamber 20 and a second predetermined position 40 in the first direction may be obtained to determine the second current position. The ionization chamber 20 reciprocates back and forth in the X-direction. The second predetermined position 40 may be a position of the surface density device 100 along the X-direction toward the ionization chamber 20. For example, in the embodiments of this application, the second predetermined position 40 is a plane located in positive X-direction of the ionization chamber 20. The second current distance may be measured using a second distance sensor 102. The second distance sensor 102 may be installed on the ionization chamber 20 or at the second predetermined position 40. The second distance sensor 102 is, for example, a laser sensor. The second distance sensor 102 can measure and obtain the second current distance by emitting light and receiving reflected light.

In step S41, a difference between the first current distance and a first initial distance may be calculated and used as a first difference; and a difference between the second current distance and a second initial distance may be calculated and used as a second difference; and when a difference between the first difference and the second difference is greater than a first predetermined difference, it is determined that the radiation source 10 has undergone a pose change with respect to the ionization chamber 20.

Specifically, the first initial distance is a distance measured between the radiation source 10 and the first predetermined position 30 after calibration of the radiation source 10 in the surface density device 100, and based on the first difference, it can be determined whether a position change has occurred on the radiation source 10 in the X-direction. In one example, the first current distance is LAX1', the first initial distance is LAX1, and the first difference is XA1, then XA1=LAX1'−LAX1.

The second initial distance is a distance measured between the ionization chamber 20 and the second predetermined position 40 after calibration of the ionization chamber 20 in the surface density device 100, and based on the second difference, it can be determined whether a position change has occurred on the ionization chamber 20 in the X-direction. In one example, the second current distance is LBX1', the second initial distance is LBX1, and the second difference is XB1, then XB1=LBX1'−LBX1.

A large difference between the first difference and the second difference indicates that the radiation source 10 has undergone a position change with respect to the ionization chamber 20 in a moving direction of the radiation source 10. In one example, the difference between the first difference and the second difference is $\Delta X$, and $\Delta X = XA1 - XB1$. If $\Delta X$ is greater than the first predetermined difference, it is determined that the radiation source 10 has undergone a pose change with respect to the ionization chamber 20.

In summary, the first current position and the second current position can be used to detect whether the ionization chamber 20 and the radiation source 10 have undergone a pose change relative to each other in the first direction.

Figure 9:
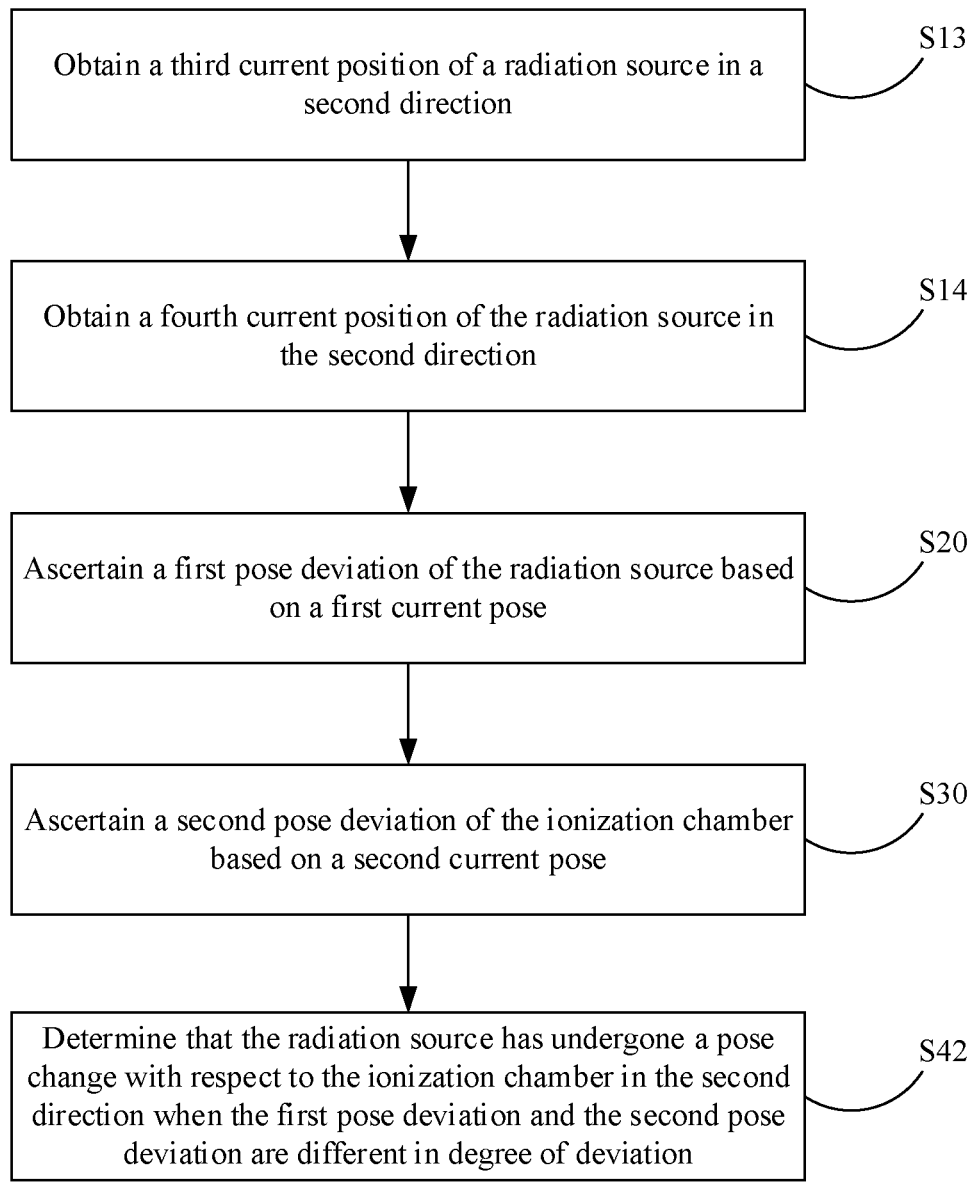
FIG. 9 is a schematic flowchart of a detection method according to an embodiment of this application.

Refer to FIG. 9. In some embodiments, step S110 includes:

S13. Obtain a third current position of the radiation source 10 in a second direction (such as Y-direction in FIG. 2), where the second direction is the same as a moving direction of the radiation source 10, and the second direction is perpendicular to an arrangement direction of the radiation source 10 and the ionization chamber 20; and S14. Obtain a fourth current position of the radiation source 10 in the second direction, where the first current pose includes the third current position and the second current pose includes the fourth current position.

Step S40 includes:

S42. Determine that the radiation source 10 has undergone a pose change with respect to the ionization chamber 20 in the second direction when the first pose deviation and the second pose deviation are different in degree of deviation.

Specifically, in step S13, the third current position may be represented by a distance. In other words, a third current distance between the radiation source 10 and a third predetermined position 50 in the second direction may be obtained to determine the third current position. An object under measurement may move along the Y-direction. The third predetermined position 50 may be a position of the surface density device 100 along the Y-direction toward the radiation source 10. For example, in the embodiments of this application, the third predetermined position 50 may be a plane perpendicular to the Y-direction of the radiation source 10 and the negative Y-direction passes through the third predetermined position 50. The third current distance may be measured using a third distance sensor 103. The third distance sensor 103 may be installed on the radiation source 10 or at the third predetermined position 50. To reduce the number of third distance sensors 103, in the embodiments of this application, the third distance sensor 103 is installed on the radiation source 10. The third distance sensor 103 is, for example, a laser sensor. The third distance sensor 103 can measure and obtain the third current distance by emitting light and receiving reflected light.

In step S14, the fourth current position may be represented by a distance. In other words, a fourth current distance between the ionization chamber 20 and a fourth predetermined position 60 in the second direction may be obtained to determine the fourth current position.

The fourth predetermined position 60 may be a position of the surface density device 100 along the Y-direction toward the radiation source 10. For example, in the embodiments of this application, the fourth predetermined position 60 is a plane perpendicular to the Y-direction of the ionization chamber 20 and the negative direction of the Y-direction passes through the third predetermined position 50, where the third predetermined position 50 and the fourth predetermined position 60 may be in a same plane. The fourth current distance may be measured using a fourth distance sensor 104. The fourth distance sensor 104 may be installed on the ionization chamber 20 or at the fourth predetermined position 60. To reduce the number of fourth distance sensors 104, in the embodiments of this application, the fourth distance sensor is installed on the radiation source 10. The fourth distance sensor 104 is, for example, a laser sensor. The fourth distance sensor 104 can measure and obtain the fourth current distance by emitting light and receiving reflected light.

In step S42, a difference between the third current distance and a third initial distance may be calculated and used as a third difference; and a difference between the fourth current distance and a fourth initial distance may be calculated and used as a fourth difference; and when a difference between the third difference and the fourth difference is greater than a second predetermined difference, it is determined that the radiation source 10 has undergone a pose change with respect to the ionization chamber 20.

The third initial distance is a distance measured between the radiation source 10 and the third predetermined position 50 after calibration of the radiation source 10 in the surface density device 100, and based on the third difference, it can be determined whether a position change has occurred on the radiation source 10 in the Y-direction. In one example, the third current distance is LAY', the third initial distance is LAY, and the third difference is YAY; then, YAY=LAY'−YAY The fourth initial distance is a distance measured between the ionization chamber 20 and the fourth predetermined position 60 after calibration of the ionization chamber 20 in the surface density device 100, and based on the fourth difference, it can be determined whether a position change has occurred on the ionization chamber 20 in the Y-direction. In one example, the fourth current distance is LBY', the fourth initial distance is LBY, and the fourth difference is YBY, then YBY=LBY'−YBY A large difference between the third difference and the fourth difference indicates that the radiation source 10 has undergone a position change with respect to the ionization chamber 20 in a moving direction of the object under measurement. In one example, the difference between the third difference and the second difference is ΔY, and ΔY=YAY−YBY. If ΔY is greater than the second predetermined difference, it is determined that the radiation source 10 has undergone a pose change with respect to the ionization chamber 20.

In this way, the third current position and fourth current position can be used to detect whether the ionization chamber 20 and the radiation source 10 have undergone a pose change relative to each other in the moving direction of the object under measurement.

Figure 10:
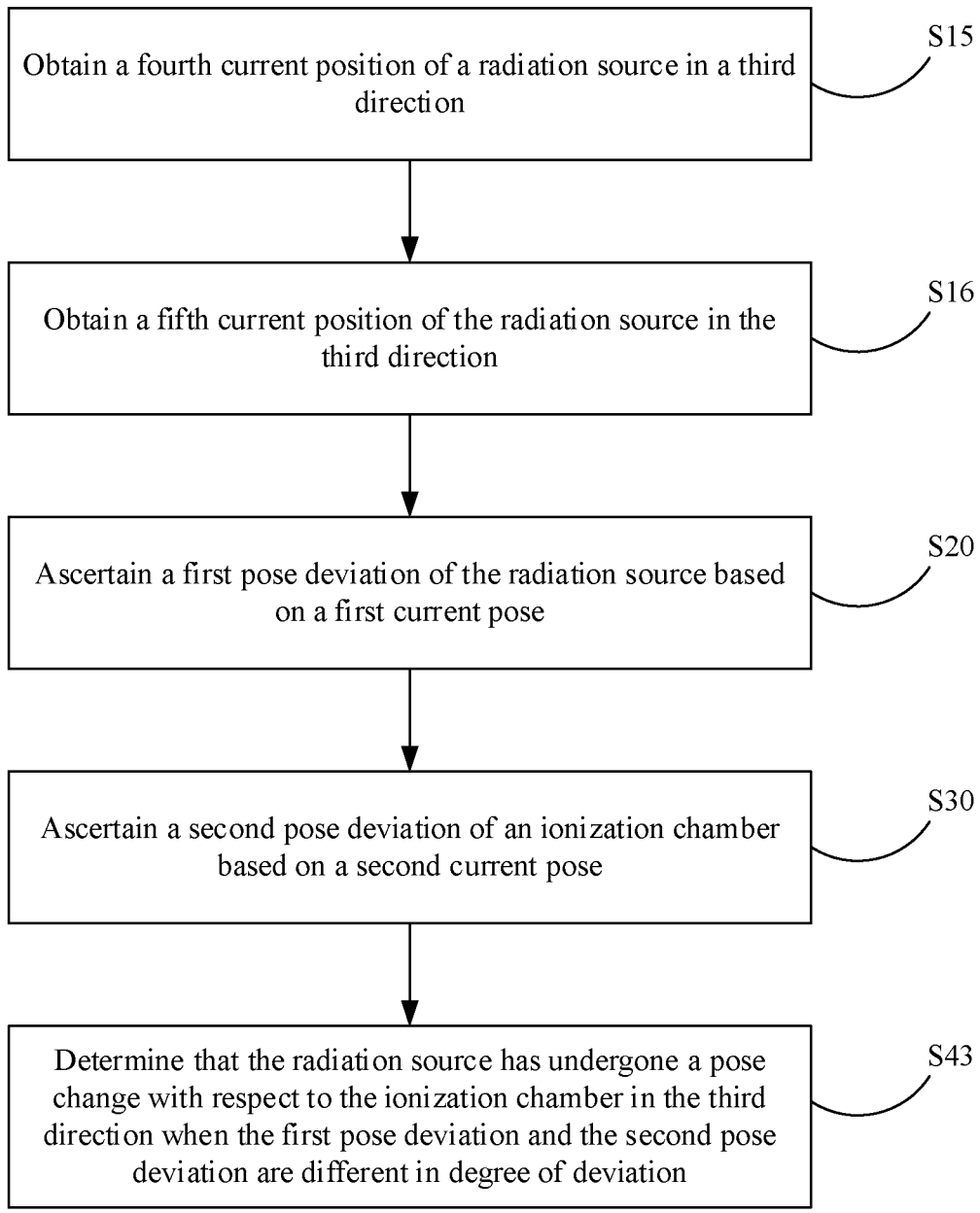
FIG. 10 is a schematic flowchart of a detection method according to an embodiment of this application.

Refer to FIG. 10. In some embodiments, step S110 includes:

S15. Obtain a fourth current position of the radiation source 10 in a third direction (such as Z-direction in FIG. 2), the third direction being the same as an arrangement direction of the radiation source 10 and the ionization chamber 20; and S16. Obtain a fifth current position of the radiation source 10 in the third direction, where the first current pose includes the fourth current position and the second current pose includes the fifth current position.

Step S40 includes:

S43. Determine that the radiation source 10 has undergone a pose change with respect to the ionization chamber 20 in the third direction when the first pose deviation and the second pose deviation are different in degree of deviation.

In step S15, the fifth current position may be expressed by a distance. In other words, a fifth current distance between the radiation source 10 and the object under measurement may be obtained to determine the fifth current position. The object under measurement is located in the Z-direction of the radiation source 10, and the fifth current distance may be measured using the fifth distance sensor 105. The fifth distance sensor 105 may be installed on the radiation source 10. The fifth distance sensor 105 is, for example, a laser sensor. The fifth distance sensor 105 can measure and obtain the fifth current distance by emitting light and receiving reflected light.

In step S16, a sixth current position may be represented by a distance. In other words, a sixth current distance between the ionization chamber 20 and the object under measurement may be obtained to determine the sixth current position. The sixth current distance may be measured using a sixth distance sensor 106. The sixth distance sensor 106 may be installed on the ionization chamber 20. The sixth distance sensor 106 is, for example, a laser sensor. The sixth distance sensor 106 may measure and obtain the sixth current distance by emitting light and receiving reflected light.

In step S43, a difference between the fifth current distance and a fifth initial distance may be calculated and used as a fifth difference; and a difference between the sixth current distance and a sixth initial distance may be calculated and used as a sixth difference; and when a sum of the fifth difference and the sixth difference is greater than a predetermined value, it is determined that the radiation source 10 has undergone a pose change with respect to the ionization chamber 20.

The fifth initial distance is a distance measured between the radiation source 10 and the object under measurement after calibration of the radiation source 10 in the surface density device 100, and based on the fifth difference, it can be determined whether a position change has occurred on the radiation source 10 in the Z-direction. In one example, the fifth current distance is LAZ', the fifth initial distance is LAZ, and the fifth difference is ZAZ; then, ZAZ=LAZ'−ZAZ.

The sixth initial distance is a distance between the ionization chamber 20 and the object under measurement after calibration of the ionization chamber 20 in the surface density device 100, and based on the sixth difference value, it can be determined whether a position change has occurred on the ionization chamber 20 in the Z-direction. In one example, the sixth current distance is LBZ', the sixth initial distance is LBZ, and the sixth difference is ZBZ, then ZBZ=LBZ'−ZBZ.

A large difference between the fifth difference and the sixth difference indicates that the radiation source 10 has undergone a position change with respect to the ionization chamber 20 in a moving direction of the object under measurement. In one example, the difference between the fifth difference and the second difference is $\Delta Z$, and $\Delta Z$=ZAZ−ZBZ. If $\Delta Z$ is greater than the second predetermined difference, it is determined that the radiation source 10 has undergone a pose change with respect to the ionization chamber 20.

In this way, the fifth current position and the sixth current position can be used to detect whether the ionization chamber 20 and the radiation source 10 have undergone a pose change relative to each other in the moving direction of thickness under measurement.

It should be noted that the measurement error due to the thickness difference of the object under measurement is negligible because the thickness difference of the object under measurement is small.

Figure 11:
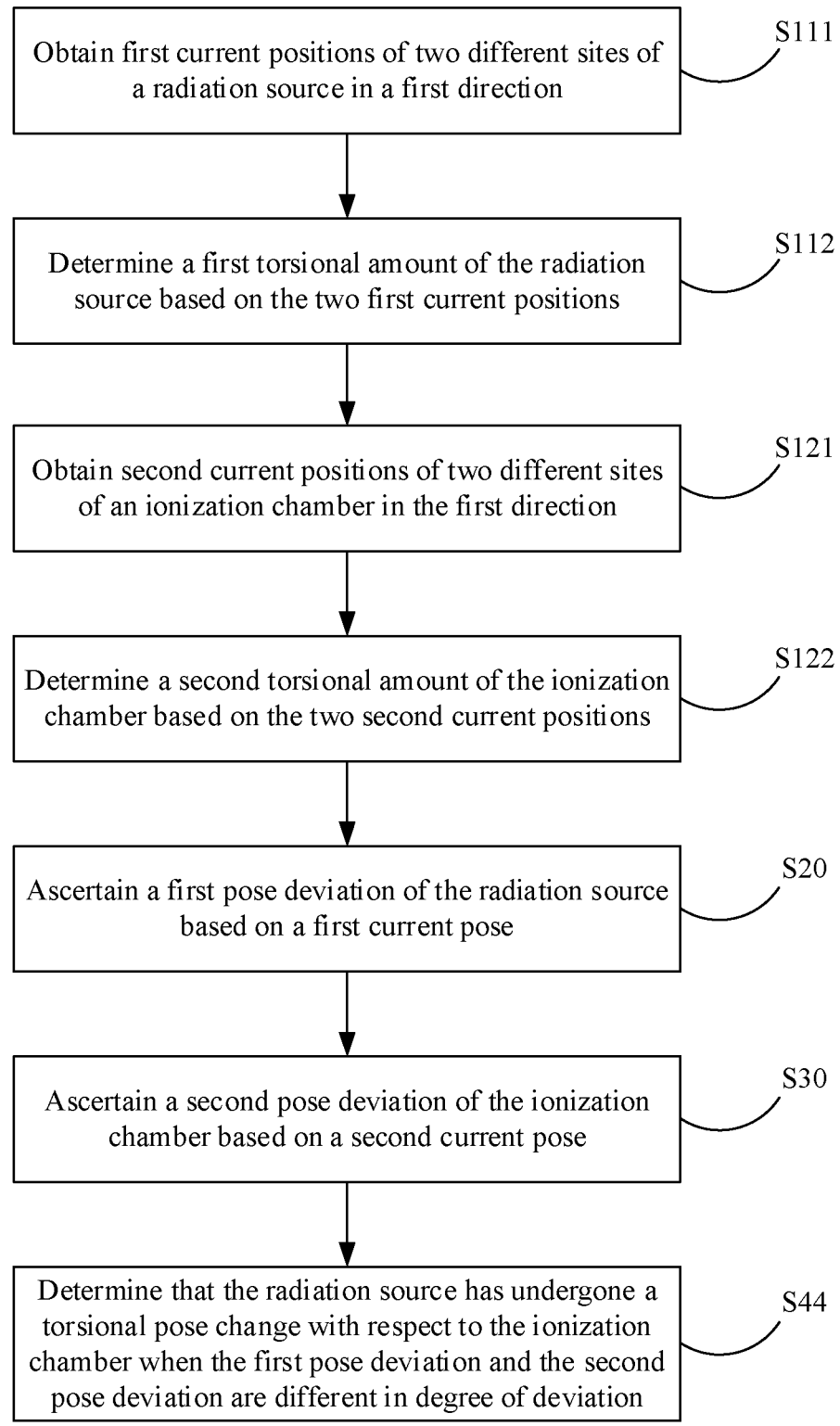
FIG. 11 is a schematic flowchart of a detection method according to an embodiment of this application.

Refer to FIG. 11. In some embodiments, step S11 includes:

S111. Obtain first current positions of two different sites of the radiation source 10 in the first direction; and S112. Determine a first torsional amount of the radiation source 10 based on the two first current positions, where the first current pose includes the first torsional amount.

Step S12 includes:

S121. Obtain second current positions of two different sites of the ionization chamber 20 in the first direction; and S122. Determine a second torsional amount of the ionization chamber 20 based on the two second current positions, where the second current pose includes the second torsional amount.

Step S40 includes:

S44. Determine that the radiation source 10 has undergone a torsional pose change with respect to the ionization chamber 20 when the first pose deviation and the second pose deviation are different in degree of deviation.

Specifically, in steps S111 and S112, a first current distance between a first radiation site of the radiation source 10 and the first predetermined position 30 in a moving direction of the first radiation site may be obtained as one of the first current positions; and a seventh current distance between a second radiation site of the radiation source 10 and the first predetermined position 30 in a moving direction of the second radiation site may be obtained as another first current position, the second radiation site being on a same side of the radiation source 10 as the first radiation site.

As discussed above, the first current distance may be measured using the first distance sensor 101. The first distance sensor 101 may be installed at the first radiation site of the radiation source 10 or at the first predetermined position 30. The first distance sensor 101 is, for example, a laser sensor. The first distance sensor 101 can measure and obtain the first current distance by emitting light and receiving reflected light.

Similarly, as shown in FIG. 2, the seventh current distance may be measured using a seventh distance sensor 107. The seventh distance sensor 107 may be installed at the second radiation site of the radiation source 10 or at the first predetermined position 30. The seventh distance sensor 107 is, for example, a laser sensor. The seventh distance sensor 107 may measure and obtain the seventh current distance by emitting light and receiving reflected light.

In the embodiments of this application, the first radiation site and the second radiation site are two different positions on the radiation source 10, and the first radiation site and the second radiation site may be entities, such as planes or structures, with specific features.

A first torsion angle of the radiation source 10 may be calculated based on the first current distance, the seventh current distance, and the first predetermined distance, the first predetermined distance being a distance between the center of the first radiation site and the center of the second radiation site.

Figure 12:
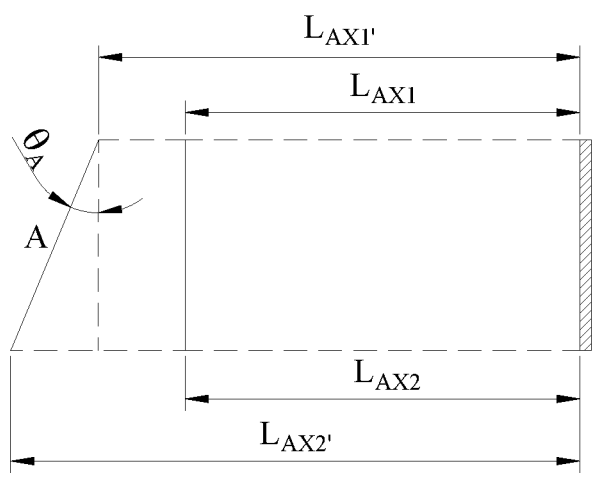
FIG. 12 is a schematic diagram of a calculation principle in a detection method according to an embodiment of this application.

The first predetermined distance is the distance measured between the radiation source 10 and the first predetermined position 30 after calibration of the radiation source 10 in the surface density device 100. Refer to FIG. 12. In one example, the first current distance is LAX1', the seventh current distance is LAX2', the first initial distance is LAX1, the seventh initial distance is LAX2, the first predetermined distance is A, and the first torsion angle is $\theta A$, then $$\theta A = \arcsin([|(LAX1'-LAX1)-(LAX2'-LAX2)|]/A).$$

In steps S121 and S122, a second current distance between a first ionization site of the ionization chamber 20 and the second predetermined position 40 in a moving direction of the first ionization site may be obtained as one of the second current positions; and an eighth current distance between a second ionization site of the ionization chamber 20 and the second predetermined position 40 in a moving direction of the second ionization site may be obtained as another second current position.

As discussed above, the second current distance may be measured using the second distance sensor 102. The second distance sensor 102 may be installed at the first ionization site of the ionization chamber 20 or at the second predetermined position 40. The second distance sensor 102 is, for example, a laser sensor. The second distance sensor 102 can measure and obtain the second current distance by emitting light and receiving reflected light.

Similarly, the eighth current distance may be measured using an eighth distance sensor 108. The eighth distance sensor 108 may be installed at the second ionization site of the ionization chamber 20 or at the second predetermined position 40. The eighth distance sensor 108 is, for example, a laser sensor, and the eighth distance sensor 108 may measure and obtain the eighth current distance by emitting light and receiving reflected light.

In the embodiments of this application, the first ionization site and the second ionization site are two different positions on the ionization chamber 20, and the first ionization site and the second ionization site may be entities, such as planes or structures, with specific features.

A second torsion angle of the radiation source 10 may be calculated based on the second current distance, the eighth current distance, and the second predetermined distance, the second predetermined distance being a distance between the center of the first ionization site and the center of the second ionization site.

The second predetermined distance is the distance measured between the ionization chamber 20 and the second predetermined position 40 after calibration of the radiation source 10 in the surface density device 100. In one example, the second current distance is LBX1', the seventh current distance is LBX2', the second initial distance is LBX1, the seventh initial distance is LBX2, the second predetermined distance is B, and the second torsion angle is θB, then θB=arcsin([|(LBX1'−LBX1)−(LBX2'−LBX2)|]/B).

It is noted that the first predetermined distance A may be equal to the second predetermined distance B.

In step S44, it can be determined that the radiation source 10 has undergone a pose change with respect to the ionization chamber 20 when a sum of the first torsion angle and the second torsion angle is greater than a torsion angle threshold.

A large sum of the first torsion angle and the second torsion angle indicates that the radiation source 10 has undergone a position change with respect to the ionization chamber 20 in a moving direction of the radiation source 10. In one example, the sum of the first torsion angle and the second torsion angle is θ, and θ=θA+θB. If θ is greater than the torsion angle threshold, it is determined that the radiation source 10 has undergone a pose change with respect to the ionization chamber 20.

In this way, it is possible to determine whether a pose change in a torsional state between the radiation source 10 and the ionization chamber 20 has occurred by using the first torsion angle and the second torsion angle.

In the embodiments of this application, because the radiation source 10 and the ionization chamber 20 move reciprocally during operation, initial poses need to be determined in advance so that a relationship between a current pose and an initial pose can be detected in real time for the radiation source 10 and the ionization chamber 20. Therefore, after the calibration of the surface density device 100, a respective initial pose at multiple positions is obtained, so that multiple initial poses can be obtained and whether a pose change has occurred on the radiation source 10 and the ionization chamber 20 can be detected and ascertained when the radiation source 10 and the ionization chamber 20 are at any position during operation.

In some embodiments, the obtaining (S10) a first current pose of the radiation source 10 and a second current pose of the ionization chamber 20 includes:
  obtaining the first current pose by using a measurement result of a distance sensor provided on the radiation source 10; and
  obtaining the second current pose by using a measurement result of a distance sensor provided on the ionization chamber 20.

As discussed above, the first to the eighth distance sensors can be used to measure corresponding distances to obtain current poses of the radiation source 10 and the ionization chamber 20. In this way, current poses of the radiation source 10 and the ionization chamber 20 can be easily obtained based on the distance sensors.

Figure 13:
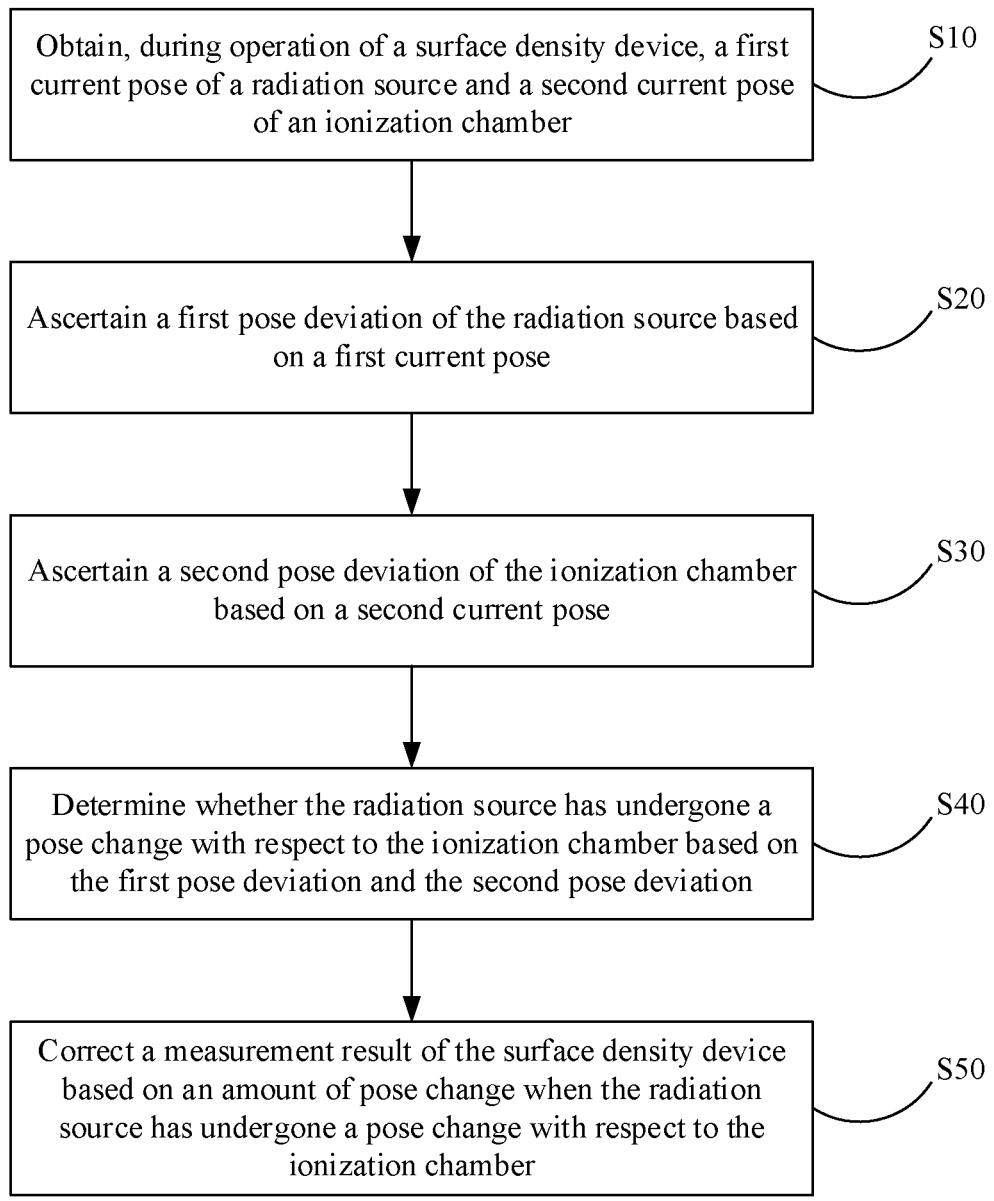
FIG. 13 is a schematic flowchart of a detection method according to an embodiment of this application.

Refer to FIG. 13. In some embodiments, the detection method further includes:
  S50. Correct a measurement result of the surface density device 100 based on an amount of pose change when the radiation source 10 has undergone a pose change with respect to the ionization chamber 20.

In this way, the measurement result of the surface density device 100 is corrected based on the amount of pose change, making the measurement result of the surface density device 100 more accurate. For example, when it is ascertained that the radiation source 10 having undergone a pose change with respect to the ionization chamber 20 causes the measurement result to be too large, the measurement result can be corrected and reduced to make the measurement result more accurate.

In addition, in some embodiments, an alert and warning can be issued when the radiation source 10 has undergone a pose change with respect to the ionization chamber 20 to facilitate works such as evaluation of the device status, maintenance, and repair, effectively preventing the surface density device 100 from working in a faulty state and avoiding safety hazards caused by large batches of products.

The surface density device 100 in the embodiments of this application includes a radiation source 10, an ionization chamber 20 spaced from the radiation source 10, a memory, a processor, and a computer program stored on the memory and capable of running on the processor, where when the program is executed by the processor, the steps of the method in any one of the foregoing embodiments are implemented.

For example, the processor may perform the following steps of the detection method:
  S10. Obtain, during operation of the surface density device 100, a first current pose of the radiation source 10 and a second current pose of the ionization chamber 20;
  S20. Ascertain a first pose deviation of the radiation source 10 based on the first current pose;
  S30. Ascertain a second pose deviation of the ionization chamber 20 based on the second current pose; and
  S40. Determine whether the radiation source 10 has undergone a pose change with respect to the ionization chamber 20 based on the first pose deviation and the second pose deviation.

In this way, the current poses of the radiation source 10 and the ionization chamber 20 are first obtained separately, and then it is ascertained whether the radiation source 10 has undergone a pose change with respect to the ionization chamber 20 based on the current poses, so that when the radiation source 10 has undergone a pose change with respect to the ionization chamber 20, corresponding measures can be taken to improve the accuracy of measurement results of the surface density device 100.

In some embodiments, both the radiation source 10 and the ionization chamber 20 are provided with distance sensors, the distance sensors being configured to detect distances from the radiation source 10 and the ionization chamber 20 to a predetermined position. In this way, current poses of the radiation source 10 and the ionization chamber 20 can be easily obtained based on the distance sensors.

It should be noted that the explanatory description of the detection method in the foregoing embodiments is applicable to the detection means of this application, and for parts of the detection means not described in the embodiments of this application, reference may be made to the corresponding part of the foregoing detection method. Details are not repeated herein.

Figure 14:
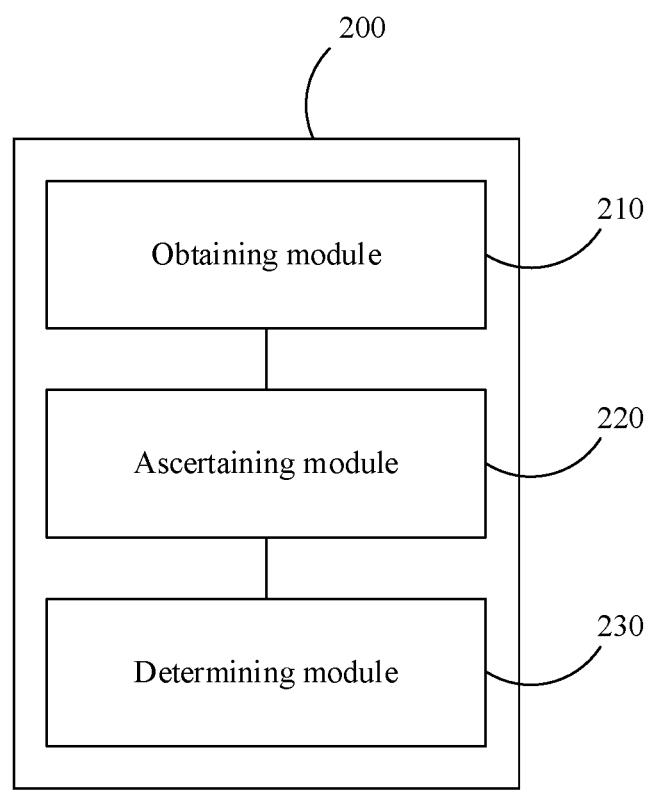
FIG. 14 is a schematic diagram of a module of a detection means according to an embodiment of this application.

Refer to FIG. 14. A detection means 200 in an embodiment of this application includes an obtaining module 210, an ascertaining module 220, and a determining module 230. The obtaining module 210 is configured to obtain, during operation of a surface density device 100, a first current pose of the radiation source 10 of the surface density device 100 and a second current pose of the ionization chamber 20 of the surface density device 100. The ascertaining module 220 is configured to calculate a first pose deviation between the first current pose and a first initial pose of the radiation source 10 and a second pose deviation between the second current pose and a second initial pose of the ionization chamber 20. The determining module 230 is configured to determine whether the radiation source 10 has undergone a pose change with respect to the ionization chamber 20 based on the first pose deviation and the second pose deviation.

In this way, the current poses of the radiation source 10 and the ionization chamber 20 are first obtained separately, and then it is ascertained whether the radiation source 10 has undergone a pose change with respect to the ionization chamber 20 based on the current poses, so that when the radiation source 10 has undergone a pose change with respect to the ionization chamber 20, corresponding measures can be taken to improve the accuracy of measurement results of the surface density device 100.

It should be noted that the detection means 200 in this embodiment of this application can implement the detection method in any one of the foregoing embodiments. The steps of the detection method in the foregoing embodiments can be performed by the corresponding modules of the detection means 200. Details are not repeated herein.

In addition, the explanatory description of the detection method in the foregoing embodiments is applicable to the detection means 200 of this application, and for parts of the detection means 200 not described in the embodiments of this application, reference may be made to the corresponding part of the foregoing detection method. Details are not repeated herein.

A non-volatile computer-readable storage medium of computer-executable instructions, where when the computer-executable instructions are executed by one or more processors, the processors are enabled to perform the detection method in any one of the foregoing embodiments.

In the description of this specification, reference to the description of the terms "an embodiment", "some embodiments", "an example of the embodiment", "an example", "a specific example", or "some examples" means that particular features, structures, materials or characteristics described in connection with the embodiments or examples are included in at least one embodiment or example of this application. In this specification, descriptions of examples of the above terms do not necessarily refer to the same embodiment or example. Furthermore, the particular features, structures, materials, or characteristics described may be combined in a suitable manner in any one or more embodiments or examples.

Any process or method description in the flowchart or otherwise described herein may be understood to represent a module, fragment, or portion of code including one or more executable instructions for implementing steps of a particular logical function or process, and the scope of the embodiments of this application includes additional implementations in which the functions may be performed not in the order shown or discussed, including performing the functions involved in a substantially simultaneous manner or in a reverse order, as should be understood by those skilled in the art to which the embodiments of this application belong.

The logic and/or steps represented in the flowchart or otherwise described herein, for example, may be considered to be a definitive list of executable instructions for implementing the logical functions, which may be specifically implemented in any computer-readable medium for use by, or in combination with, an instruction execution system, apparatus, or device (for example, a computer-based system, a system including a processing module, or other systems that can obtain instructions from an instruction execution system, apparatus, or device and execute the instructions). For the purposes of this specification, a "computer-readable medium" may be any apparatus that can contain, store, communicate, transfer, or transmit a program for use in or in conjunction with the instruction execution system, apparatus, or device. More specific examples of the computer-readable medium (a non-exhaustive list) include the following: an electrically connected portion with one or more wiring (electronic apparatus), a portable computer disk cartridge (magnetic apparatus), a random access memory (RAM), a read-only memory (ROM), an erasable editable read-only memory (EPROM or flash memory), a fiber optic apparatus, and a portable compact disc read-only memory (CDROM). Alternatively, the computer-readable medium may even be a paper on which the program may be printed or other suitable medium, because the program may be obtained electronically, for example, through optical scanning of the paper or other medium, followed by editing, decoding, or, if necessary, processing in other suitable ways, and then the program is stored in a computer memory.

It should be understood that the various parts of the embodiments of this application may be implemented by hardware, software, firmware, or a combination thereof. In the foregoing embodiments, multiple steps or methods may be implemented by software or firmware stored in memory and executed by a suitable instruction execution system. For example, if implemented by hardware, as in another embodiment, they may be implemented by any one of the following techniques known in the art or by a combination thereof: a discrete logic circuit with a logic gate circuit for implementing the logic function on data signals, an application-specific integrated circuit with a suitable combination of logic gate circuits, a programmable gate array (PGA), a field programmable gate array (FPGA), and the like.

Persons of ordinary skill in the art can understand that all or part of the steps of the foregoing method embodiment to adjust the focal power can be completed by a program to instruct relevant hardware, where the program may be stored in a computer-readable storage medium, and when the program is executed, one of or a combination of the steps of the method embodiment are included.

In addition, functional units in the various embodiments of this application may be integrated into one processing module, or each of the units may exist alone physically, or two or more units may be integrated into one module. The integrated module may be implemented in a form of hardware, or may be implemented in a form of a software functional module. When the integrated module is implemented in the form of a software functional module and sold or used as an independent product, the integrated module may also be stored in a computer-readable storage medium. The storage medium mentioned above may be a read-only memory, a disk, a compact disc, or the like.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A detection method of a surface density device comprising a radiation source and an ionization chamber spaced from the radiation source, the detection method comprising:
   obtaining, during operation of the surface density device, a first current pose of the radiation source and a second current pose of the ionization chamber;
   ascertaining a first pose deviation of the radiation source based on the first current pose;
   ascertaining a second pose deviation of the ionization chamber based on the second current pose; and
   determining whether the radiation source has undergone a pose change with respect to the ionization chamber based on the first pose deviation and the second pose deviation.

2. The detection method according to claim 1, wherein obtaining the first current pose of the radiation source and the second current pose of the ionization chamber comprises:
   obtaining current positions of the radiation source and the ionization chamber in at least one direction to determine the first current pose and the second current pose.

3. The detection method according to claim 2, wherein:
   obtaining the current positions of the radiation source and the ionization chamber in the at least one direction to determine the first current pose and the second current pose comprises:
      obtaining a first current position of the radiation source in a first direction, the first direction being the same as a moving direction of the radiation source; and
      obtaining a second current position of the ionization chamber in the first direction, wherein the first current pose comprises the first current position and the second current pose comprises the second current position; and
   determining whether the radiation source has undergone the pose change with respect to the ionization chamber based on the first pose deviation and the second pose deviation comprises:
      determining that the radiation source has undergone a pose change with respect to the ionization chamber in the first direction when the first pose deviation and the second pose deviation are different in degree of deviation.

4. The detection method according to claim 3, wherein:
   obtaining the first current position of the radiation source in a first direction comprises:
      obtaining first current positions of two different sites of the radiation source in the first direction; and
      determining a first torsional amount of the radiation source based on the two first current positions, wherein the first current pose comprises the first torsional amount;
   obtaining the second current position of the ionization chamber in the first direction comprises:
      obtaining second current positions of two different sites of the ionization chamber in the first direction; and
      determining a second torsional amount of the ionization chamber based on the two second current positions, wherein the second current pose comprises the second torsional amount; and
   determining whether the radiation source has undergone the pose change with respect to the ionization chamber based on the first pose deviation and the second pose deviation comprises:
      determining that the radiation source has undergone a torsional pose change with respect to the ionization chamber when the first pose deviation and the second pose deviation are different in degree of deviation.

5. The detection method according to claim 2, wherein:
   obtaining the current positions of the radiation source and the ionization chamber in at least one direction to determine the first current pose and the second current pose comprises:
      obtaining a third current position of the radiation source in a second direction, wherein the second direction is perpendicular to a moving direction of the radiation source, and the second direction is perpendicular to an arrangement direction of the radiation source and the ionization chamber; and
      obtaining a fourth current position of the radiation source in the second direction, wherein the first current pose comprises the third current position and the second current pose comprises the fourth current position; and
   determining whether the radiation source has undergone the pose change with respect to the ionization chamber based on the first pose deviation and the second pose deviation comprises:
      determining that the radiation source has undergone a pose change with respect to the ionization chamber in the second direction when the first pose deviation and the second pose deviation are different in degree of deviation.

6. The detection method according to claim 2, wherein:

obtaining the current positions of the radiation source and the ionization chamber in at least one direction to determine the first current pose and the second current pose comprises:

obtaining a fourth current position of the radiation source in a third direction, the third direction being the same as an arrangement direction of the radiation source and the ionization chamber; and obtaining a fifth current position of the radiation source in the third direction, wherein the first current pose comprises the fourth current position and the second current pose comprises the fifth current position; and determining whether the radiation source has undergone the pose change with respect to the ionization chamber based on the first pose deviation and the second pose deviation comprises:

determining that the radiation source has undergone a pose change with respect to the ionization chamber in the third direction when the first pose deviation and the second pose deviation are different in degree of deviation.

7. The detection method according to claim 1, further comprising:

correcting a measurement result of the surface density device based on an amount of pose change when the radiation source has undergone the pose change with respect to the ionization chamber.

8. A surface density device, comprising:
a radiation source;
an ionization chamber spaced from the radiation source;
a processor; and
a memory storing a computer program that, when executed by the processor, causes the processor to perform the method according to claim 1.

9. The surface density device according to claim 8, wherein both the radiation source and the ionization chamber are provided with distance sensors, the distance sensors being configured to detect distances from the radiation source and the ionization chamber to a predetermined position.

10. A non-transitory and non-volatile computer-readable storage medium storing computer-executable instructions that, when executed by one or more processors, cause the one or more processors to perform the detection method according to claim 1.

11. A detection means, comprising:
an obtaining module configured to obtain, during operation of a surface density device, a first current pose of the radiation source of the surface density device and a second current pose of the ionization chamber of the surface density device;
an ascertaining module configured to ascertain a first pose deviation of the radiation source based on the first current pose and a second pose deviation of the ionization chamber based on the second current pose; and
a determining module configured to determine whether the radiation source has undergone a pose change with respect to the ionization chamber based on the first pose deviation and the second pose deviation.

* * * * *